United States Patent
Nguyen et al.

(10) Patent No.: US 6,832,198 B1
(45) Date of Patent: Dec. 14, 2004

(54) SPLIT AND JOINT COMPRESSED AUDIO WITH MINIMUM MISMATCHING AND DISTORTION

(75) Inventors: Kha D. Nguyen, Boca Raton, FL (US); Craig Kindell, Delray Beach, FL (US); Kenneth L. Milsted, Boynton Beach, FL (US); Marco M. Hurtado, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 09/606,469

(22) Filed: Jun. 29, 2000

(51) Int. Cl.[7] ............................................. G10L 21/00
(52) U.S. Cl. ..................... 704/500; 704/200.1
(58) Field of Search ................ 369/30.19; 84/609; 707/101; 704/200, 200.1, 201, 500–504

(56) References Cited

U.S. PATENT DOCUMENTS 6,353,173 B1 * 3/2002 D'Amato et al. ............. 84/609
6,446,073 B1 * 9/2002 D'Amato et al. ........... 707/101
6,556,518 B2 * 4/2003 Isobe et al. ............... 369/30.19

* cited by examiner

Primary Examiner—David D. Knepper
(74) Attorney, Agent, or Firm—David M. Shofi; Jon A. Gibbons; Fleit, Kain, Gibbons, Gutman, Bongini & Bianco P.L.

(57) ABSTRACT

The present invention provides a system, computer program product and a method for overlapping boundary data of an audio information track which includes ending data from a previous track and starting data from a succeeding track. By doing this, the ending data from a previous track and the beginning data from a succeeding track are available for the compression process. The compression program then manipulates the additional appended data in order to generate the compressed audio. Later, by severing the overlapping appended additional information before recombining the tracks, the resulting No-Pause CD audio stream is free from distortion and mismatch.

23 Claims, 7 Drawing Sheets

SPLIT AND JOINT COMPRESSED AUDIO WITH MINIMUM MISMATCHING AND DISTORTION

CROSS-REFERENCE TO RELATED APPLICATIONS

Not Applicable

FIELD OF THE INVENTION

This invention relates to improvements in a method and system for the storing and playback of audio data stored as track information on a storage medium.

BACKGROUND OF THE INVENTION

A music compact disc (CD) commonly has multiple tracks composed of musical data. Each of these tracks are separated by a pause or period of silence that indicates to the listener that a new track is about to start. However, some CDs do not use this convention. For example, a live recording or classical CD might not have any pauses but it also, like an ordinary CD, has multiple tracks; this type of CD is considered for purposes of this disclosure a NO-Pause CD. In this case, the tracks are played as one continuous audio stream. Ordinarily, a listener does not even notice the transition from one track to the next unless he or she is watching the track number displayed on the player.

Audio Data Retrieval Across a Network (100)

However, in certain instances, a listener notices the transition from one transition to another. In particular, a problem arises when CD music is purchased across a network or sent to be duplicated at a reproduction facility. FIG. 1 illustrates a prior art system (100) comprising a network overview for audio data retrieval from an optical disk storage rack. This system comprises: an optical storage rack (102) comprising multiple CDs, a network file server (104), a network (106) and workstations (108a to 108n). Data is extracted from each track of a particular CD from the optical rack (102), and is compressed by the network file server (104) or a dedicated extraction-compression node not shown in FIG. 1. This data is then transmitted over the network (106), and received at the workstations (108a to 108n) where the individual tracks are decompressed and recombined. Finally, the tracks are burnt onto a CD or stored on a hard disk. For a common CD with pauses between tracks, this scenario works well. However, for a NO-Pause CD, this algorithm produces an unpleasant side effect which is annoying to the listener. This occurs when a No-Pause CD is transmitted across a network for reproduction at another location it is first split into multiple tracks; then each track is compressed individually and later decompressed and put back together at the receiving end. As a result of the compression decompression process and of the transmission, the seams where the tracks are rejoined always have some distortion and the connecting points in the audio wave form are mismatched, i.e. discontinued. Thus, a high frequency spike in the wave form is created which is heard by a listener as a clicking sound.

A prior art solution to this problem is to store an entire CD as one audio stream. However, when dealing with individual track audio streams, there is greater flexibility in allowing individual songs to be downloaded as well as greater management facility in controlling a digital music library of songs, play-lists, and albums. Therefore, this prior art solution does not facilitate an effective playback apparatus.

Encoding Decoding Standard (200 and 300)

Further, a typical prior art protocol and system for encoding and decoding of compact disc information is illustrated with regards to FIGS. 2 and 3. This system and protocol are highlighted in U.S. Pat. No. 5,809,474, which is hereby incorporated by reference. This international audio coding standard, i.e., IS 11172-3 proposed in the Moving Picture Experts Group (MPEG), provides a high-quality audio playback signal for use in, for example, a compact disk (CD), at 128 Kbps per audio channel. This international standard can be used to store an audio signal in a digital storage medium such as a CD, a digital audio tape (DAT), or a hard disk, and may reconstruct an audio signal by connecting the storage medium to a decoder directly or through other means such as a communication line. Further, a bit stream encoded by an encoder may be directly reconstructed to an audio signal in a decoder through a communication line.

While implementing such an encoder and decoder in a system, analysis and synthesis filtering algorithms perform the most computations in the whole system. In particular, in an audio decoder, most of the time is consumed in a band synthesis filtering algorithm. Hence, the issue of how to efficiently realize the analysis and synthesis filtering algorithms is closely related to efficiently implementing the audio encoder and decoder.

That is, realization of the audio encoder and decoder in exclusive-use hardware by efficient implementation of the analysis and synthesis filtering algorithms reduces time required for encoding and decoding. Thus, the encoder and decoder may be realized using a slower and cheaper processor available. Further, due to increasing use of multimedia devices along with development of computers, communications, and broadcasting, there is an increase in the need for reconstructing an audio signal by decoding an encoded bit stream using software, rather than exclusive-use hardware. Though improvement of the performance of the multimedia devices increases the probability of real-time processing in a general-purpose processor of high performance, a fast algorithm enables operations of real-time processing software in more general-purpose processors.

Encoding Unit (200)

FIG. 2 is a block diagram (200) of an audio encoder adopting an MPEG audio standard IS 11172-3 encoder. The audio encoder of FIG. 2 has a mapper (202) for analysis-windowing and time/frequency mapping an input signal, a psychoacoustic model (208) for assigning bits to each band by using psychoacoustic characteristics, a quantizer/encoder (204) for quantizing and encoding the mapped signal according to the number of bits assigned to a band, and a frame packer (206) for generating a bit stream. The encoded bit stream is stored onto an optical disk (210) by a laser servo (212) or sent across a network.

The mapper (202) classifies an input audio bit stream according to a frequency band using an analysis window. Time/frequency mapped samples are called sub-band samples in layer I or II of MPEG, or transformed sub-band samples in layer III. The classification of the signal according to a band contributes to alleviate distribution of noise caused by quantization across the entire bands, when the signals are reconstructed.

The psycho-acoustic model (208) models the procedure of human perception of sound, using especially a masking phenomenon and a critical band among psycho-acoustic characteristics. The psycho-acoustic model (208) produces a data set for controlling quantization and encoding.

The quantizer/encoder (204) performs quantization and encoding to prevent errors involved in signal reconstruction from being perceived by a human being, using the result of computations in the psycho-acoustic model.

The frame packer (206) efficiently combines quantized data with information needed for decoding, and produces a bit stream by the Huffman coding method.

Decoding Unit (300)

FIG. 3 is a block diagram (300) of an audio decoder adopting a high-speed band synthesis filtering algorithm, here, an MPEG audio standard IS 11172-3 decoder. The decoder of FIG. 3 has a frame un-packer (302) for unpacking a signal from an input bit stream or from a storage device (308) using a laser servo (310), a decoder/inverse-quantizer (304) for decoding and inverse-quantizing the quantized signal, and an inverse-mapper (306) for time/frequency inverse-mapping and synthesis-windowing the inverse-quantized signal.

The frame un-packer (302) separates quantized audio data and other additional information to be decoded from an encoded bit stream.

The decoder/inverse-quantizer (304) reconstructs the quantized audio data to the values prior to quantization using the quantization step-size.

The inverse-mapper (306) converts frequency-domain data to time-domain data. The time-domain sample values are synthesis-windowed and converted to the time-domain signal by overlap-and-add (OLA).

Shortcomings with Compression

As previously described, distortions and waveform mismatches in a compact disc playback process originate from an audio compression process. The compression program uses the past, present and future audio data to generate compressed audio. When a track is compressed at the beginning of the track, the compression program assumes silence for the past data; the present and future audio data is available from the current track. At the end of the current track, the compression program assumes silence for future audio data; the past and present data are available from the track. These assumptions are valid if the track actually has silence at the beginning and at the end of the tracks as is true for tracks in most CDs.

However, for a No-Pause CD, this is not true since at the beginning of any given track except for the first track on the No-Pause CD, the past data is not silence; rather, the No-Pause CD has audio information which is at the end of track a previous track. Further, at the end of the current track, the future audio data is not silence, rather it is the beginning of the next track. Therefore, the compression program's assumptions for a regular CD are inapplicable and incorrect for a No-Pause CD. Because of these incorrect assumptions, the compressed/decompressed audio track becomes noticeably distorted upon playback at the beginning and at the end of the tracks.

Finally, what is needed is a solution to the distortion and the mismatched connecting points of the audio wave that are formed as a result of a continuous audio signal being broken down into individual tracks and later being recombined.

Moreover, a need exists for a method and apparatus to remove the high frequency spike in the wave form that is created and heard by a listener as a clicking sound must be avoided.

SUMMARY OF THE INVENTION

Distortions and waveform mismatches in a compact disc playback process originate from an audio compression process. A compression program uses the past, present and future audio data to generate compressed audio. When a track is compressed at the beginning of the track, the compression program assumes silence for the past data; the present and future audio data is available from the current track. At the end of the current track, the compression program assumes silence for future audio data; the past and present data are available from the track. These assumptions are valid if the track actually has silence at the beginning and at the end of the tracks as is true for tracks in most CDs. However, for a No-Pause CD, this is not true since at the beginning of any given track except for the first track on the No-Pause CD, the past data is not silence; rather, the No-Pause CD has audio information which is at the end of track the previous track. Further, at the end of the current track, the future audio data is not silence, rather it is the beginning of the next track. Therefore, the compression program's assumptions for a regular CD are inapplicable and incorrect for a no-pause CD. Because of these incorrect assumptions, the compressed/decompressed audio track becomes noticeably distorted upon playback at the beginning and at the end of the tracks. The solution for this problem is to append overlapping boundary data to the beginning and end of each track. By doing this, the ending data from the previous track and the beginning data from a succeeding track are available for the compression process. The compression program then manipulates the additional appended data in order to generate the compressed audio. Later, by severing the overlapping appended additional information before recombining the tracks, the resulting NO-Pause CD audio stream is free from distortion and mismatch.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

Figure 1:
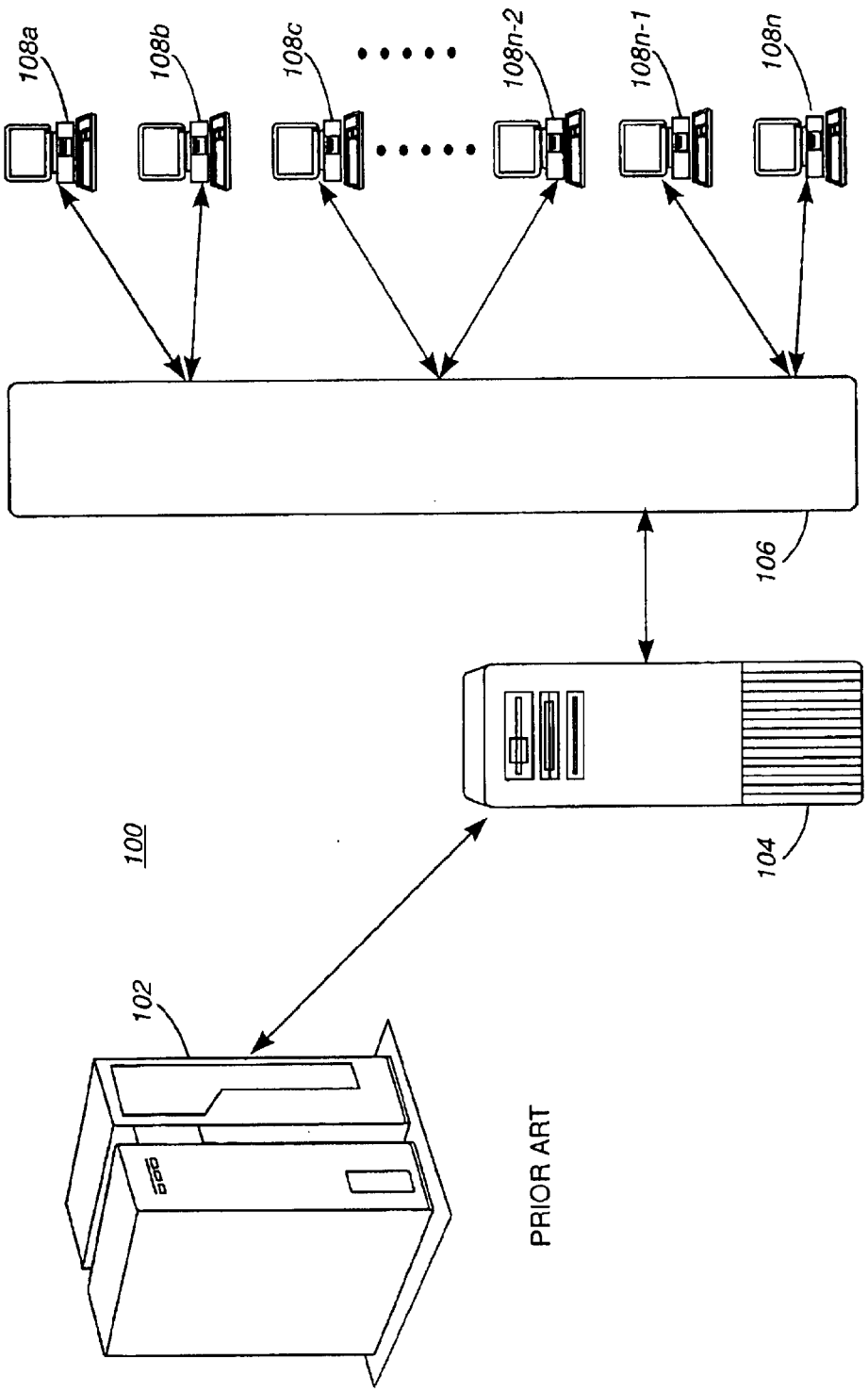
FIG. 1 is a system level overview of a typical prior art distributed information processing network within which the present invention may be practiced.
Figure 2:
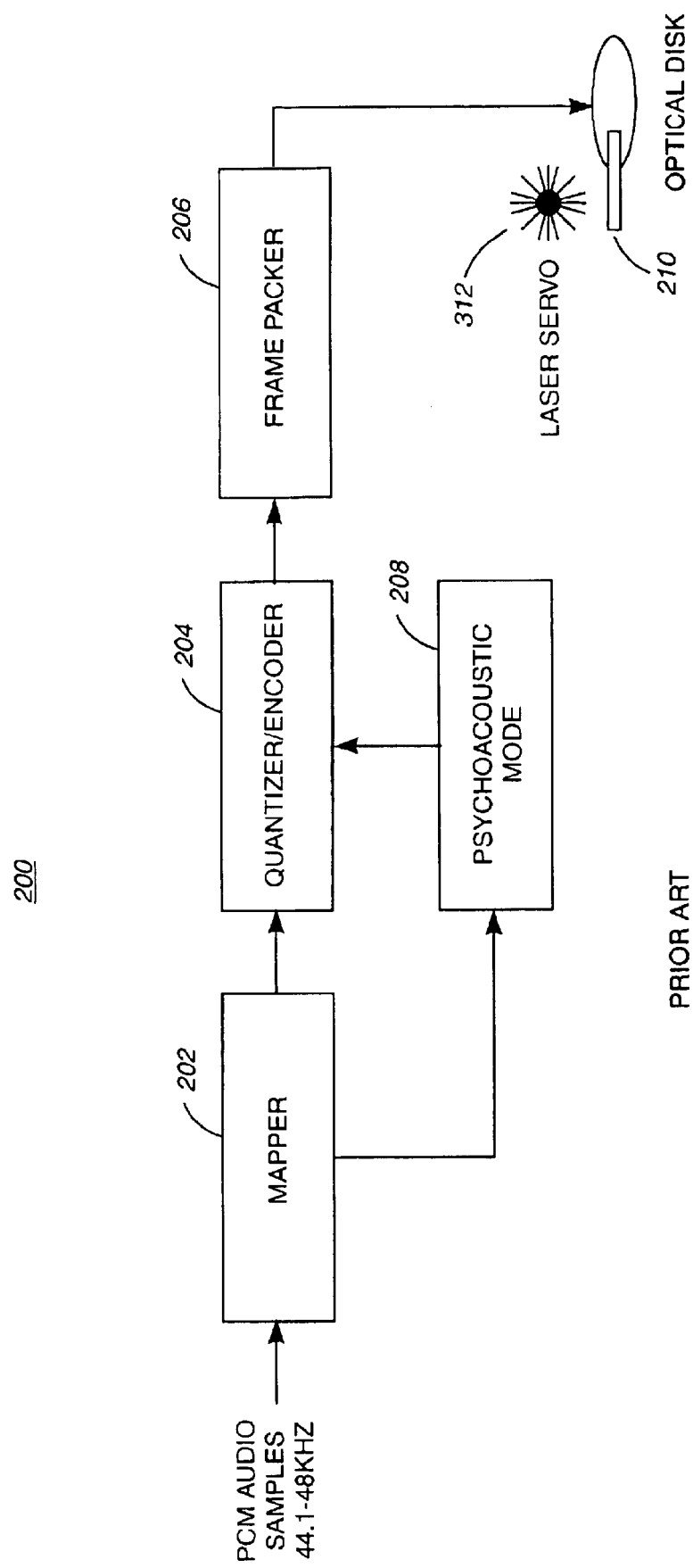
FIG. 2 is a block diagram of the basic structure of an MPEG international standardized encoder found in the prior art within which the invention may be practiced.
Figure 3:
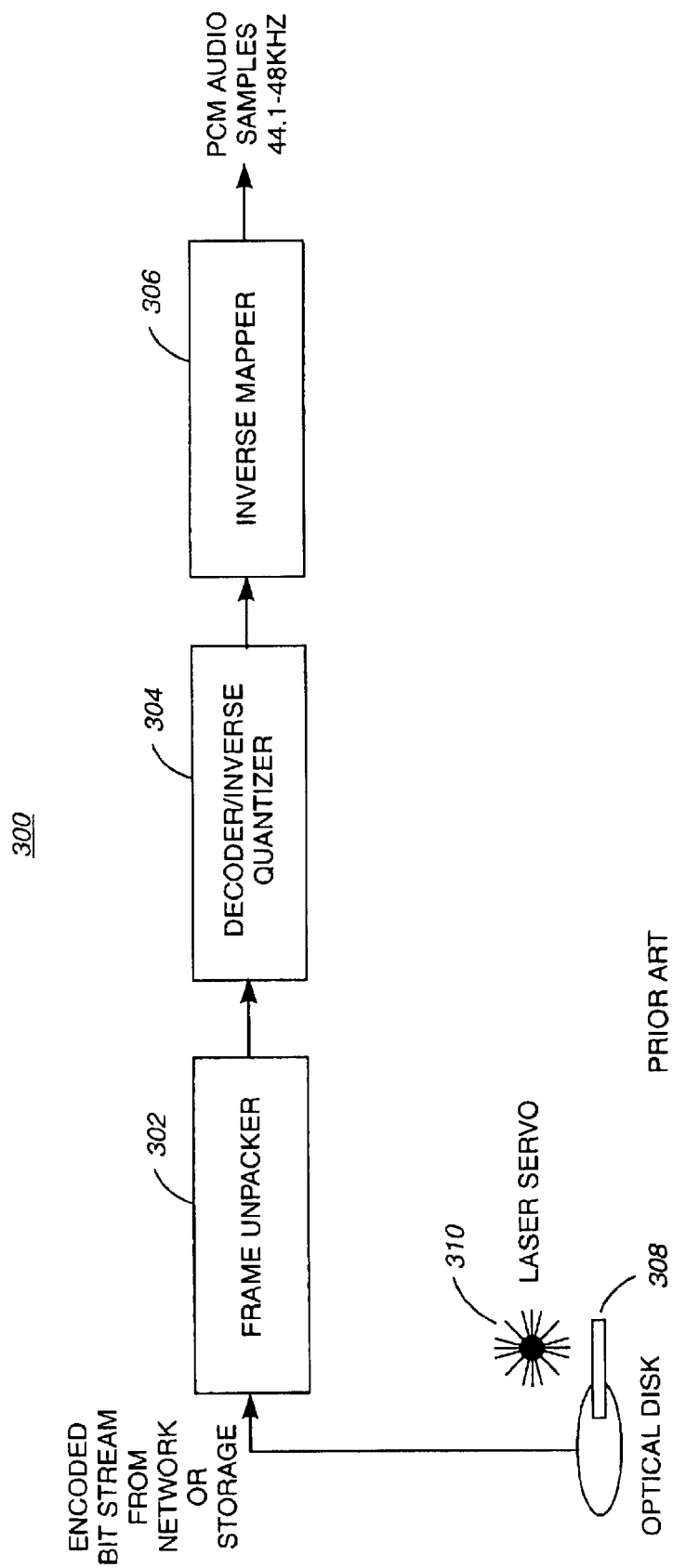
FIG. 3 is a block diagram of the basic structure of an MPEG international standardized decoder found in the prior art within which the invention may be practiced.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Figure 4:
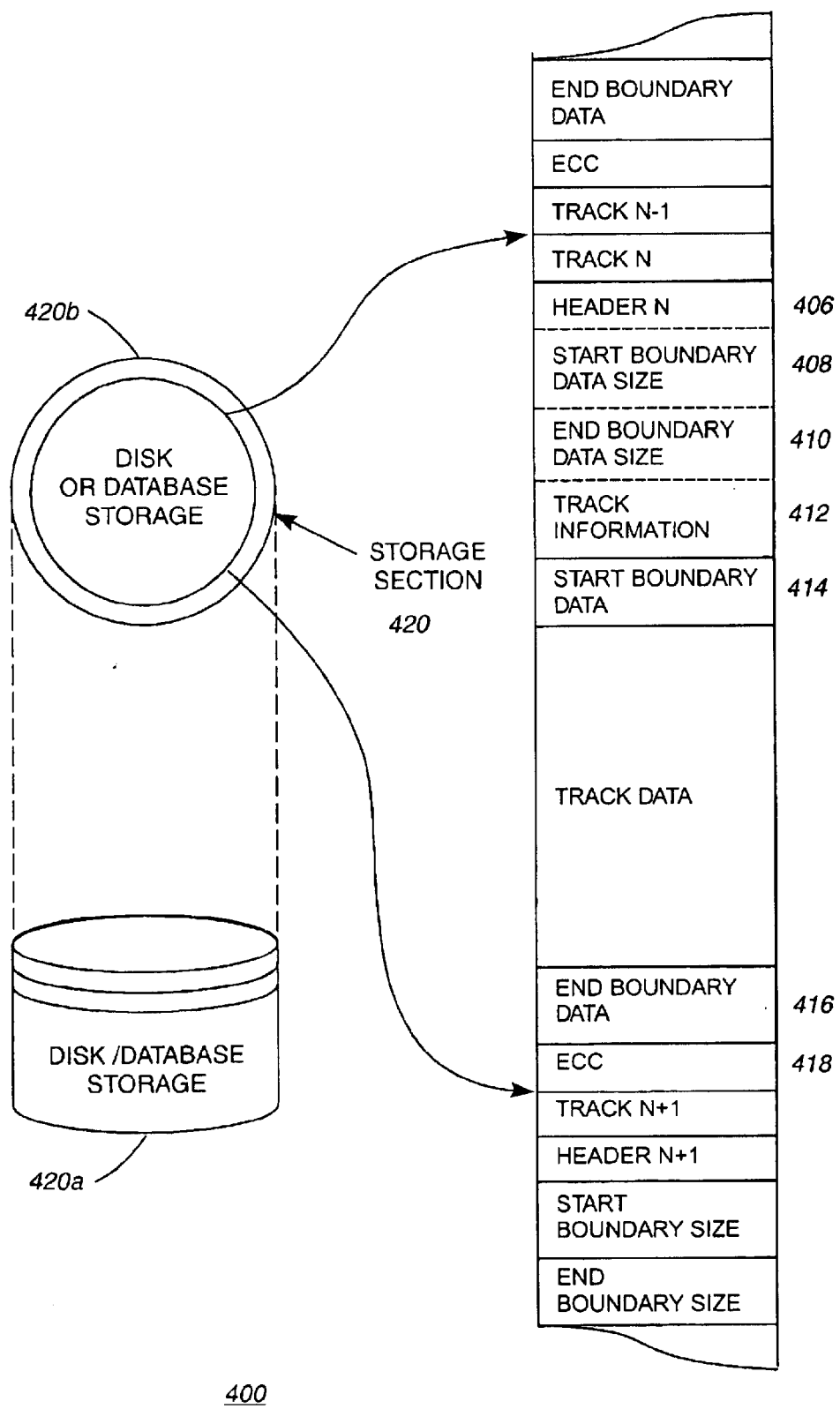
FIG. 4 is a block diagram of the invention illustrating a Disk, Database or Optical Storage illustrating a Track Structure including the Appended Boundary Data Information.

Exemplary Embodiment (400, Storage Medium Track Structure including the Appended Boundary Data Information FIG. 4 is a block diagram (400) of the invention illustrating a Disk, Database or Optical Storage (402a, 402b) illustrating a Track Structure (420) including the Appended Boundary Data Information (414, 416). For each track N, the Track Structure (420) is composed of a Track Header (406), a Start Boundary Data Size (408), an End Boundary Data Size (410), auxiliary Track Information (412), Start Boundary Data (414), Track Data (415); End Boundary Data (416) and Error Correction Code (ECC 418). This invention solves the problems of distortion and the mismatched connecting points of the audio wave; these are formed as a result of a continuous audio signal being broken down into individual tracks and later being recombined. Also, a high frequency spike in the wave form that is created and heard by a listener as a clicking sound is avoided by the practice of this invention in a playback reproduction process. In particular, this invention solves the problem by adding an overlap of audio (414) from the end of previous track to beginning of the current track and also adding an overlap of audio (416) from the beginning of the next track to the end of the current track. While all tracks in a continues audio stream contain this overlapping information, only the first track and the last track of the storage medium do not have the beginning and ending overlaps respectively; this because there is no audio information in existence on the storage medium prior to the first track nor after the last track that needs to be reconstructed with information from a previous or a succeeding track. The size of the beginning overlap and the end overlap is calculated based on the particular audio compression algorithm implementation; this is determined by the frame size in order to coincide with a frame boundary. Also, information such as the sizes of the beginning (408) and ending overlaps (410) must be stored in the current track header (406).

The minimum size of appended additional overlapping audio information varies depending on which audio compression technology is used. Typically 2 or 3 audio frames, 1024 samples per frame of overlap, or less than 1 ms of audio vastly improves the problem. Also, this overlapping technique has no effect whatsoever on regular CDs with pauses between tracks because adding more silence to silence has no effect. Therefore, this technique can be applied to all tracks regardless whether they are from a pause or No-Pause CD.

Audio Compression/Decompression Process (500 and 600)

Figure 5:
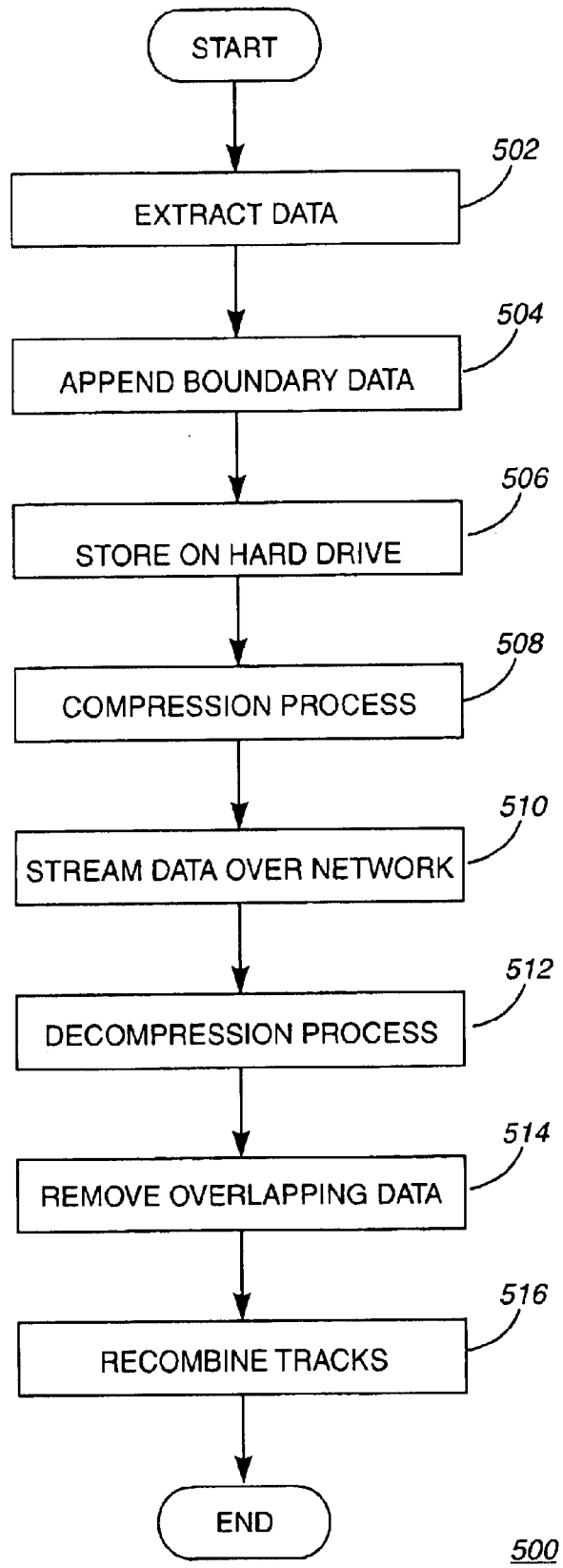
FIG. 5 is a functional overview showing an Audio Compression/Decompression process as practiced by this invention and should be viewed in conjunction with FIG. 6.
Figure 6A:
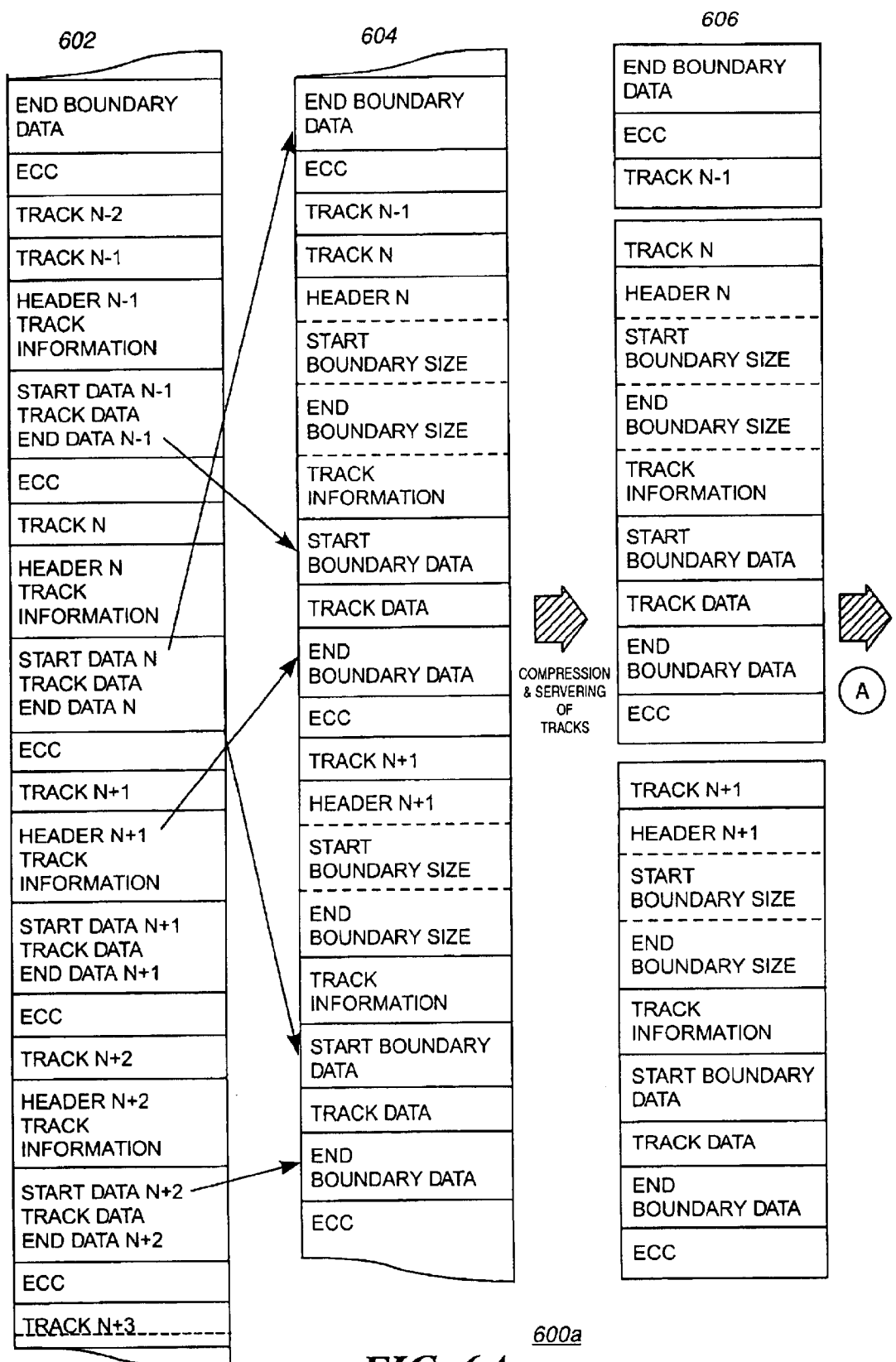
FIG. 6 is a track information overview showing Audio Compression/Decompression as practiced by this invention and should be viewed in conjunction with FIG. 5.
Figure 6B:
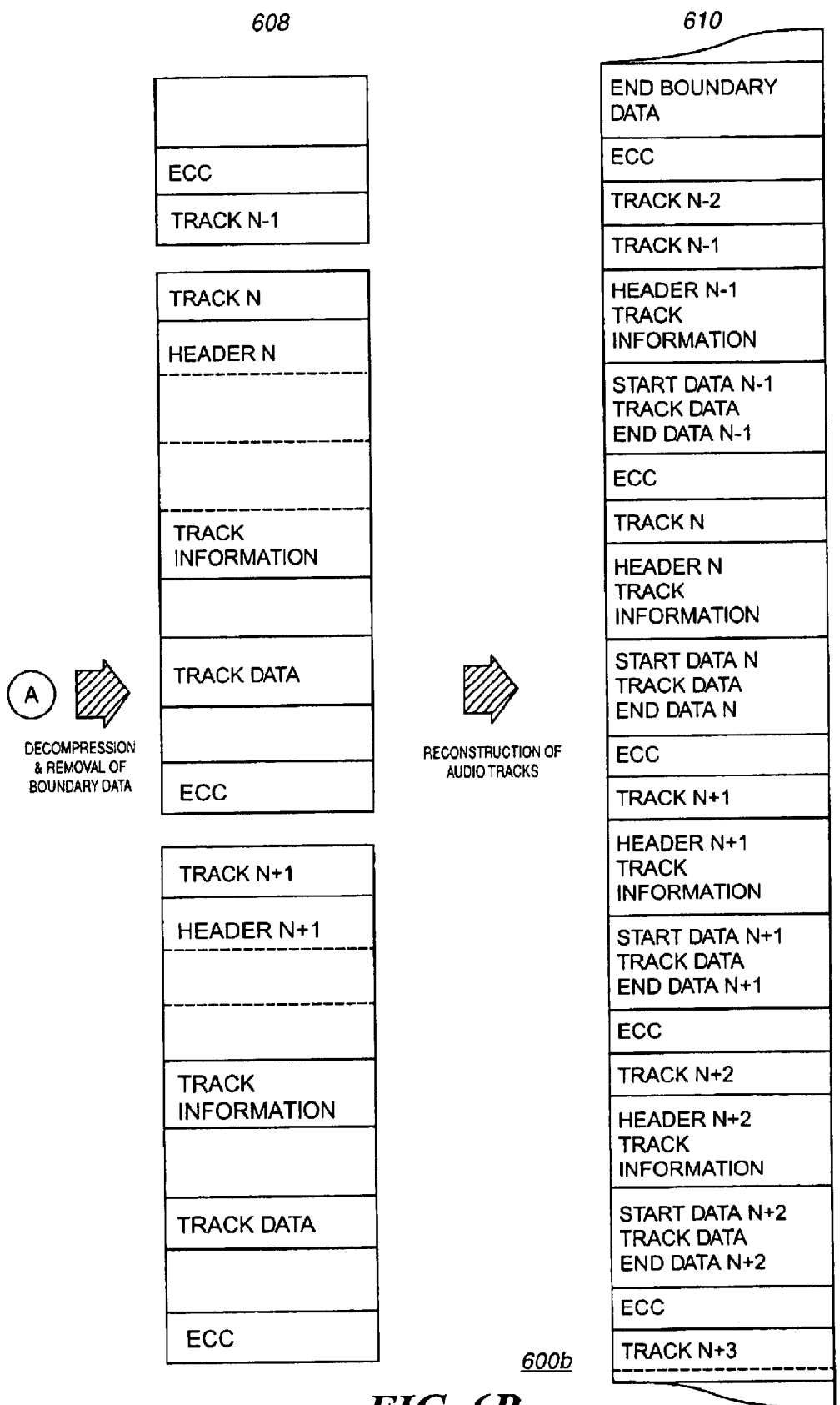

FIG. 5 is a functional overview (500) showing an Audio Compression/Decompression as practiced by this invention and should be viewed in conjunction with FIG. 6 which is a track information overview of the compression process (600). In FIG. 6, end data for a previous track is appended as start boundary data for the current track and start data for a succeeding track is end boundary data for the current track; for example (602 to 604), End Data N−1 is Start Boundary Data for Track N and Start Data N+1 is End Boundary Data for Track N. The appending of overlapping audio information (602 to 604) is accomplished while extracting the audio data (502) from a storage medium like a compact disc (CD). After appending the overlaps at the beginning and end of each track (504), the modified audio information is stored in a non-volatile memory like a hard disk (506). Then, the track compression process is executed (508). After the compression process, these modified compressed tracks are streamed over the network (510) and received at the other side. At a processing node, the tracks are decompressed (512) by a process inverse to the compression process. After the decompression process, the data is broken into tracks (606) and the overlapping appended audio information is removed (514, 608). However, by using the overlapping audio size information stored in the header, the overlapping boundary data can be removed precisely; therefore, this facilitates the reconstruction of tracks (516, 610) with a minimum amount of distortion and mismatching audio tracks. The word minimum is used here because as for most compression technologies, it is impossible to perfectly match a compressed/decompressed waveform that has been decomposed into tracks and later recombined as one continuous audio stream. As a result of this technique, the distortions and clicks at the seams of the audio tracks are greatly reduced as compared to other techniques that do not use overlapping appended boundary data.

The invention was implemented specifically in the EMMS Content Preparation Mastering Tools and End User Client Tool-kit. The tools are described in the U.S. Patent Application entitled, "Electronic Content Delivery System" with inventors Edgar Downs et al., application Ser. No. 09/133,519, now [pending], commonly assigned herewith to International Business Machines, which is hereby incorporated in its entirety by reference.

It is important to note that the term compression and decompression used herein are not limited to MPEG compression and that other types of compress such as ATRAC, AAC, AC3 and other compression technologies such as those available from Dolby™ and Fraunhauffer and others are within the true scope and spirit of the present invention.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A method for compressing audio into a plurality of tracks, comprising the steps of:
    extracting a plurality of audio information tracks from a storage device;
    appending boundary data to each of the plurality of audio information tracks, wherein boundary data from an audio information track includes ending data from a previous track and starting data from a succeeding track;
    storing the plurality of audio information tracks including the appended boundary data on a non-volatile medium; and
    compressing the plurality of audio information tracks including the appended boundary data.

2. The method as defined in claim 1, wherein the step of appending boundary data to each of the plurality of audio information tracks further comprises appending boundary data to each of the plurality of audio information tracks wherein boundary data comprises start boundary data, end boundary data, start boundary data size and end boundary data size.

3. The method as defined in claim 1, wherein the step of appending boundary data to each of the plurality of audio information tracks further comprises appending boundary data to each of the plurality of audio information tracks wherein boundary data comprises start boundary data, end boundary data, start boundary data size and end boundary data size from a current audio information track and from a next audio information track.

4. The method as defined in claim 1, wherein the step of appending boundary data to each of the plurality of audio information tracks further comprises appending the same boundary data to each of the plurality of audio information tracks except the first and last audio information tracks which first and last audio information tracks contain only end boundary data size and data and start boundary data size and data respectively.

5. The method as defined in claim 1, wherein the step of appending boundary data to each of the plurality of audio information tracks further comprises appending boundary data to each of the plurality of audio information tracks wherein boundary data comprises start boundary data, end boundary data, start boundary data size and end boundary data size except the first and last audio information tracks which boundary data of the first and last audio information tracks contain only end boundary data size and data and start boundary data size and data respectively.

6. The method as defined in claim 1, wherein the step of extracting a plurality of audio information tracks from the storage device further comprises the step of extracting a plurality of audio information tracks from the storage device wherein the storage device comprises a compact disc stored in an archive storage rack.

7. The method as defined in claim 1, wherein the first processing node comprises a processing node selected from the group of processing nodes of: dedicated node and a network file node.

8. A method as defined in claim 7, further comprising the step of:
    streaming the compressed plurality of audio information tracks including the compressed appended boundary data to a second processing node across a network.

9. A computer readable medium comprising computer instructions for compressing audio into a plurality of tracks, the programming instructions comprising:
    extracting a plurality of audio information tracks from a storage device;
    appending boundary data to each of the plurality of audio information tracks, wherein boundary data from an audio information track includes ending data from a previous track and starting data from a succeeding track;
    storing the plurality of audio information tracks including the appended boundary data on a non-volatile medium; and
    compressing the plurality of audio information tracks including the appended boundary data.

10. The computer readable medium as defined in claim 9, wherein the instruction of appending boundary data to each of the plurality of audio information tracks further comprises appending boundary data to each of the plurality of audio information tracks wherein boundary data comprises start boundary data, end boundary data, start boundary data size and end boundary data size.

11. The computer readable medium as defined in claim 9, wherein the instruction of appending boundary data to each of the plurality of audio information tracks further comprises appending boundary data to each of the plurality of audio information tracks wherein boundary data comprises start boundary data, end boundary data, start boundary data size and end boundary data size from a current audio information track and from a next audio information track.

12. The computer readable medium as defined in claim 9, wherein the instruction of appending boundary data to each of the plurality of audio information tracks further comprises appending the same boundary data to each of the plurality of audio information tracks except the first and last audio information tracks which first and last audio information tracks contain only end boundary data size and data and start boundary data size and data respectively.

13. The computer readable medium as defined in claim 9, wherein the instruction of appending boundary data to each of the plurality of audio information tracks further comprises appending boundary data to each of the plurality of audio information tracks wherein boundary data comprises start boundary data, end boundary data, start boundary data size and end boundary data size except the first and last audio information tracks which boundary data of the first and last audio information tracks contain only end boundary data size and data and start boundary data size and data respectively.

14. The computer readable medium as defined in claim 9, wherein the instruction of extracting a plurality of audio information tracks from the storage device further comprises the instruction of extracting a plurality of audio information tracks from the storage device wherein the storage device comprises a compact disc stored in an archive storage rack.

15. The computer readable medium as defined in claim 9, wherein the first processing node comprises a processing node selected from the group of processing nodes of: dedicated node and a network file node.

16. A method for reconstruction of audio information transmitted across a network having a plurality of processing nodes and a storage device containing the audio information, the method on a second processing node comprising the steps of:
- decompressing received audio information into a plurality of audio information tracks;
- removing overlapping boundary data from the plurality of audio information tracks, wherein boundary data from an audio information track includes ending data from a previous track and starting data from a succeeding track; and
- recombining the plurality of audio information tracks to create a continuous audio stream.

17. The method as defined in claim 16, wherein the step of removing overlapping boundary data from the plurality of audio information tracks further comprises removing overlapping boundary data wherein the overlapping boundary data comprises start boundary data, end boundary data, start boundary data size and end boundary data size.

18. The method as defined in claim 16, wherein the step of removing overlapping boundary data from the plurality of audio information tracks further comprises removing overlapping boundary data from each of the plurality of audio information tracks wherein the overlapping boundary data comprises start boundary data, end boundary data, start boundary data size and end boundary data size from a current audio information track and from a next audio information track.

19. The method as defined in claim 16, wherein the step of removing overlapping boundary data from the plurality of audio information tracks further comprises removing overlapping boundary data from each of the plurality of audio information tracks except the first and last audio information tracks which first and last audio information tracks contain only end boundary data size and data and start boundary data size and data respectively.

20. The method as defined in claim 16, wherein the step of removing overlapping boundary data from the plurality of audio information tracks further comprises removing overlapping boundary data from the plurality of audio information tracks wherein the overlapping boundary data comprises start boundary data, end boundary data, start boundary data size and end boundary data size except the first and last audio information tracks which boundary data of the first and last audio information tracks contain only end boundary data size and data and start boundary data size and data respectively.

21. The method as defined in claim 16, wherein the step of decompressing received audio information further comprises decompressing received audio information received from a first processing node wherein the first processing node comprises a processing node selected from the group of processing nodes of: dedicated node and a network file node.

22. A first processing node organized for audio information retrieval across a network having a plurality of processing nodes and a storage device containing audio information, the first processing node comprising:
- an extraction unit for extracting a plurality of audio information tracks from the storage device;
- an appending unit for appending boundary data to each of the plurality of audio information tracks, wherein boundary data from an audio information track includes ending data from a previous track and starting data from a succeeding track;
- a storing unit for storing the plurality of audio information tracks including the appended boundary data on a non-volatile medium; and
- a compressing unit for compressing the plurality of audio information tracks including the appended boundary data.

23. A second processing node organized for reconstruction of audio information transmitted across a network having a plurality of processing nodes and a storage device containing audio information, the second processing node comprising:
- a decompression unit for decompressing received audio information into a plurality of audio information tracks;
- a severing unit for removing overlapping boundary data from the plurality of audio information tracks, wherein boundary data from an audio information track includes ending data from a previous track and starting data from a succeeding track; and
- a reconstruction unit for recombining the plurality of audio information tracks to create a continuous audio stream.

* * * * *